April 1, 1941.    G. A. TINNERMAN    2,236,929
FASTENING DEVICE
Filed Jan. 14, 1939

INVENTOR.
GEORGE A. TINNERMAN
BY Bates, Goldrick, & Teare
ATTORNEYS

Patented Apr. 1, 1941

2,236,929

UNITED STATES PATENT OFFICE 2,236,929

FASTENING DEVICE

George A. Tinnerman, Rocky River, Ohio, assignor, by mesne assignments, to Tinnerman Products, Inc., Cleveland, Ohio, a corporation of Ohio Application January 14, 1939, Serial No. 250,946

2 Claims. (Cl. 85—36)

This invention relates to fastening devices in the form of a sheet metal nut which can be quickly applied either to the thread of a bolt or to the shank of a rivet and which will operate effectively to lock the same to an article through which the bolt or rivet extends.

Heretofore, sheet metal nuts have been made for engaging the thread of a bolt but such engagement has been made by utilizing two prongs which engage opposite sides of the shank. Thus in the case of a threaded bolt an engagement would be made with only one turn of the thread. Consequently, the strength of the entire assembly was only as strong as that of one thread on the bolt. To overcome this difficulty certain forms of sheet metal nuts have been devised for engaging more than one turn of the bolt thread, but in such fasteners the formation utilized has resulted in too rigid a structure to permit insertion of the bolt without an accompanying turning operation.

An object of the present invention therefore is to provide a sheet metal nut wherein more than one turn of the thread may be engaged and wherein the nut may still be slipped over the end of a bolt by an endwise motion and moved a sufficient degree to effect a threaded satisfactory connection therewith. Additionally the present invention provides an arrangement which will effectively hold or make a connection to the unthreaded shank of an article, such as a bolt or rivet and which will have greater holding power than any form of fastener which engages only one turn of a thread.

Figure 1:
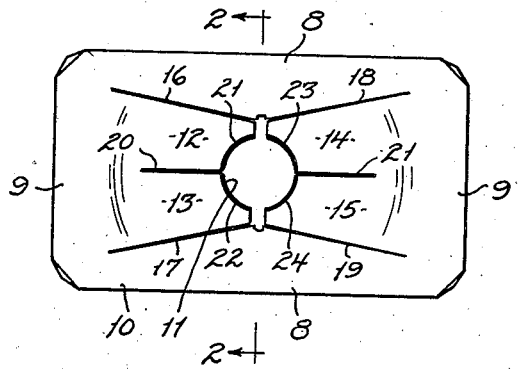
Figure 2:
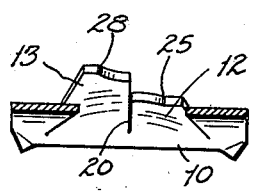
Figure 3:
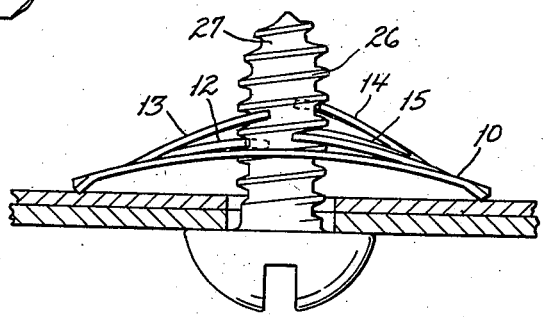
Figure 5:
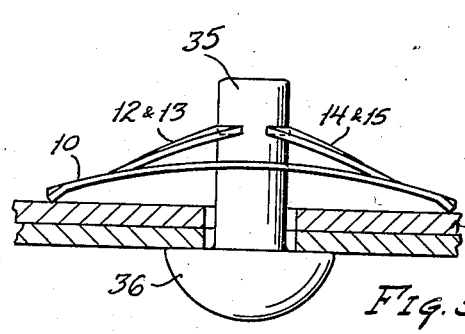
Figure 4:
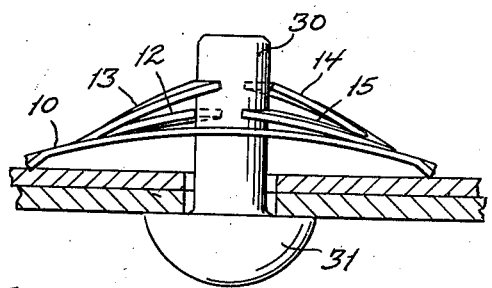
Figure 6:
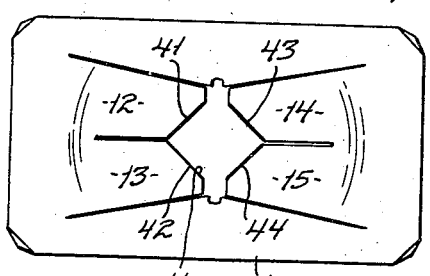

Referring now to the drawing, Fig. 1 is a top plan view of a fastener embodying the present invention; Fig. 2 is a section taken on the line 2—2 in Fig. 1; Fig. 3 is a section taken through a part to which the fastener is applied and showing its use in connection with a threaded bolt; Fig. 4 is a view similar to Fig. 3 but showing the fastener in use in connection with the unthreaded shank of a member such as a rivet; Fig. 5 is a view similar to Fig. 4 but showing the yieldable arms engaging the shank in substantially a common plane and Fig. 6 is a top plan view showing a modified formation of the thread engaging portions of the fastener.

The fastener with which the present invention is illustrated comprises a body 10 of sheet metal which has longitudinally extending side portions 8 and transversely extending end portions 9. The body has a bolt receiving opening therein from which slits 20 and 21 radiate preferably along the median line of the fastener. Additional slits 16, 17, 18 and 19 extend obliquely to the median line and preferably are longer than the slits 20 and 21 so that arms 12, 13, 14 and 15 are formed, each of which has one side longer than the other so that in effect, there are two groups of arms, each group being divided along its midportion by the slits 20 and 21. As shown in Figs. 3 and 4, the pair of arms, 13, 14, are longer than the arms 12, 15, although in vertical projection as shown in Fig. 1, they cooperate to form a central opening. Thus, the diagonally opposite arms of one pair are substantially the same in length, but different in length from the other diagonally opposite pair of arms. This arrangement maintains equilibrium of the body and at the same time allows engagement at points spaced axially on the shank of a bolt.

This construction as shown provides four independently movable arms, each of which is integral with the body and is attached thereto near the end portion thereof. When the fastener is intended for use with a threaded bolt the terminal portions 21, 22, 23 and 24 respectively are deformed so as to provide a substantially continuous helix that corresponds to that on the thread of a bolt with which the fastener is intended to be used. This arrangement is particularly shown in Figs. 2 and 3 wherein the corner 25 on the arm 12 engages one turn of a thread 26 on the bolt 27, and wherein the corner 28 on the arm 13 engages the next turn of the thread. The net result of this formation of the terminal ends of the arms is to position the arms in different planes as shown in Fig. 3, thus resulting in a four point contact with the thread of a bolt and in engagement with two turns of a bolt thread instead of one turn as heretofore has been the custom.

Where the fastener is applied to an unthreaded shank 30 of an article such as a rivet 31 the arms need not have the terminal portions thereof shaped so as to provide a helix as heretofore described, but in this arrangement, two of the arms 12 and 15 are shown as engaging the shank in one plane, while the other two arms 13 and 14 engage the shank in another plane. The arrangement of Fig. 4 therefore provides a firm engagement with the article in more than one plane and on opposite sides of the article in the same plane.

As shown in Fig. 3, the thickness of the sheet metal body 10 is less than the pitch of the thread on the bolt with which the fastener is intended to be used. Inasmuch, therefore, as the arms are formed from the body, it follows that the terminal portions of the arms engage the bolt threads and make a satisfactory threaded engagement therewith. The position of the arms at the time of contact is illustrated in Fig. 3.

The modification of Fig. 5 shows the arms engaging the shank 35 of the rivet 36 in one plane instead of in two planes as heretofore described. This is useful in some cases for holding an article wherein the operating forces acting upon it are comparatively light. The fastener in such cases is intended to hold the parts in proper position because of the fact that engagement is made on substantially a complete circle.

In Fig. 1, the terminal portions 21, 22, 23 and 24 are shown as being curved but in the modification of Fig. 6, the corresponding portions designated 41, 42, 43 and 44 are shown as being straight. In other respects, the construction of the fastener in Fig. 6 is the same as that heretofore described in connection with Fig. 1. In some uses, the straight line engagement with the bolt thread as exemplified by Fig. 6 is preferable to the curved engagement of Fig. 1, depending upon the shape of the thread on the bolt with which the fastener is intended to be used. It is to be understood that the arms, 12, 13, 14 and 15 of Fig. 6 may be shaped to provide a helix adjacent the bolt opening 11, or may be formed as shown in Figs. 4 and 5 without the helix for engagement with the unthreaded shank of an article that is intended to pass through the opening 11.

I claim:

1. A fastener comprising a sheet metal section defining a generally concavo-convex body having an opening therein for receiving a cooperating bolt, screw or other stud fastening device, said body comprising a pair of oppositely disposed sets of relatively yieldable stud engaging elements struck and formed therefrom having their extremities bordering said opening, said sets of stud engaging elements projecting from the generally convex surface of said body and each stud engaging element of a set being relatively yieldable to another and thereby adapted for independent engagement with the cooperating stud fastening device at axially spaced points in applied fastening position.

2. A fastener comprising a sheet metal section defining a generally concavo-convex body having an opening therein for receiving a cooperating bolt, screw or other threaded fastening, said body comprising a pair of oppositely disposed sets of relatively yieldable thread engaging elements struck and formed therefrom having their extremities bordering said opening, said sets of thread engaging elements projecting from the generally convex surface of said body and having the extremities thereof shaped to conform generally to the helix of the bolt or screw thread, each thread engaging element of a set being relatively yieldable to another and thereby adapted for independent engagement with the cooperating bolt or screw at axially spaced points to threadedly engage a plurality of convolutions of the thread thereof in applied fastening position.

GEORGE A. TINNERMAN.